A. PILLEP & W. ILLMANN.
Horse-Detachers.
No. 150,430.
Patented May 5, 1874.
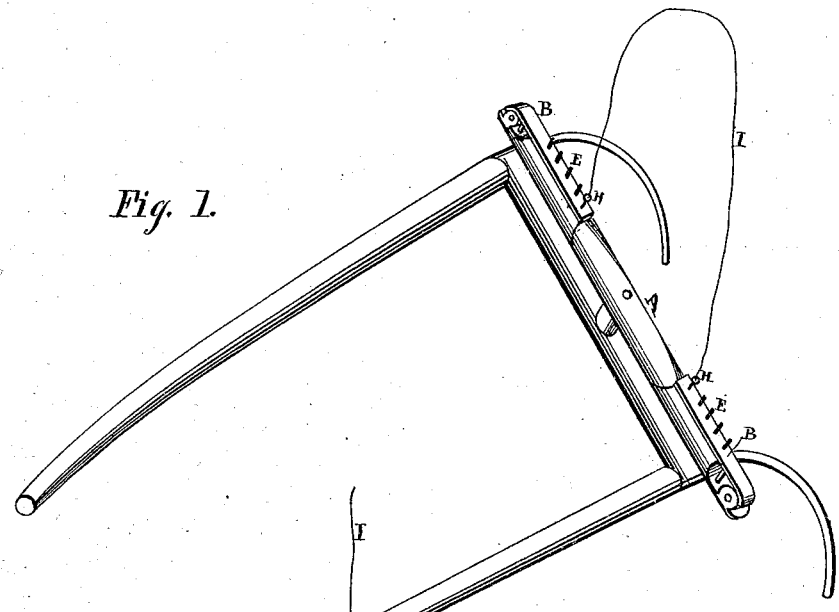
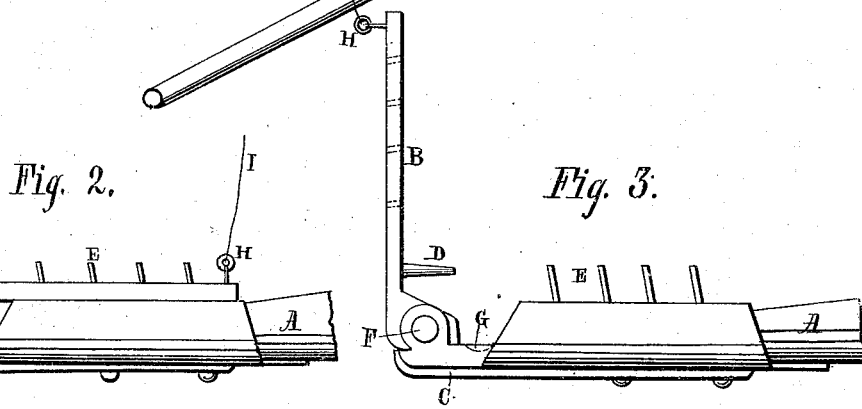
Witnesses,
Inventors.

UNITED STATES PATENT OFFICE.

AUGUSTUS PILLEP AND WILHELM ILLMANN, OF MILWAUKEE, WISCONSIN.

IMPROVEMENT IN HORSE-DETACHERS.

Specification forming part of Letters Patent No. 150,430, dated May 5, 1874; application filed March 2, 1874.

*To all whom it may concern:*

Be it known that we, AUGUSTUS PILLEP and WILHELM ILLMANN, of Milwaukee, in the county of Milwaukee, in the State of Wisconsin, have invented certain Improvements in Safety-Whiffletrees, of which the following is a specification:

Our invention has for its object the safety of persons when riding in carriages, and is accomplished by the use of a whiffletree so constructed that if the horse starts to run away the person in the carriage can, by simply pulling on a line, let the horse loose from the whiffletree, and the carriage will be left behind.

Figure 1 is a view of the thills and whiffletree. Fig. 2 is a view of the whiffletree with the catches closed down. Fig. 3, a sectional view of the whiffletree with the catches open.

A is the whiffletree; B the catch, jointed at the end of the whiffletree and resting on spring C, which holds this catch firmly in position when shut down. This spring C can be screwed down closer, so as to hold the catch more firmly. D, the pin, which holds the end of the trace, and fits into a hole in the whiffletree, and is secured to the catch. This pin is bent so that the trace pulls against the rounding side of it, and as soon as the pin is raised out of the hole in the whiffletree the end of the trace will slip off, and the trace will be free. E, pins in the whiffletree, which pass through holes in the catch which hold it firmly in place; F, joint of catch B; G, hole for the end of pin D to enter; H, a ring in the end of catch B, to which line I is attached.

The operation of this whiffletree is as follows: The line I is fastened in the carriage, and whenever it is necessary to detach the horse from the carriage, pull on the line and raise the catch, and the tugs will be let loose. The breeching of the horse is hitched to the holdback on the thills and will slip out, and the horse can run at pleasure without injury to the party or parties in the carriage.

We claim as our invention—

The combination of whiffletree A, catch B, spring C, pin D, and fastening-pins, E, substantially as described.

AUGUSTUS PILLEP.
WILHELM ILLMANN.

Witnesses:
J. B. SMITH,
E. J. SMITH.